(12) United States Patent
Howard et al.

(10) Patent No.: US 9,110,749 B2
(45) Date of Patent: Aug. 18, 2015

(54) DIGITAL CONTENT BUNDLE

(75) Inventors: James Alexander Howard, Mountain View, CA (US); William Bedford Turner, Campbell, CA (US); Tony F. Kinnis, San Jose, CA (US); Kenley Sun, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 717 days.

(21) Appl. No.: 12/791,202

(22) Filed: Jun. 1, 2010

(65) Prior Publication Data

US 2011/0295937 A1   Dec. 1, 2011

(51) Int. Cl.
G06F 9/445 (2006.01)
G06F 11/08 (2006.01)
H04L 29/06 (2006.01)
G06F 9/44 (2006.01)

(52) U.S. Cl.
CPC ............. *G06F 8/61* (2013.01); *G06F 9/4443* (2013.01); *G06F 9/44505* (2013.01); *G06F 11/08* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 5,991,399 A * | 11/1999 | Graunke et al. | 380/279 |
| 6,141,010 A | 10/2000 | Hoyle | |
| 6,289,512 B1 * | 9/2001 | Edwards et al. | 717/178 |
| 6,363,524 B1 * | 3/2002 | Loy | 717/170 |
| 6,616,533 B1 | 9/2003 | Rashkovskiy | |
| 6,651,094 B1 | 11/2003 | Dean et al. | |
| 6,807,542 B2 * | 10/2004 | Bantz et al. | 1/1 |
| 6,999,976 B2 * | 2/2006 | Abdallah et al. | 717/118 |
| 7,069,554 B1 * | 6/2006 | Stammers et al. | 717/178 |
| 7,155,713 B1 * | 12/2006 | Burkhardt et al. | 717/175 |
| 7,200,627 B2 | 4/2007 | Stickler | |
| 7,222,078 B2 | 5/2007 | Abelow | |
| 7,231,426 B1 * | 6/2007 | Hall et al. | 709/206 |
| 7,281,254 B2 * | 10/2007 | Santo et al. | 720/616 |
| 7,287,253 B2 * | 10/2007 | Yamamura et al. | 717/176 |
| 7,379,063 B2 | 5/2008 | Hoff | |
| 7,385,942 B2 * | 6/2008 | Brady et al. | 370/316 |
| 7,428,555 B2 | 9/2008 | Yan | |

(Continued)

OTHER PUBLICATIONS

"International Search Report and Written Opinion", PCT/US2010/050207, filed Sep. 24, 2010, titled "BackgroundProcess for Providing Targeted Content within a Third-Party Application," to Apple Inc., May 9, 2011.

(Continued)

*Primary Examiner* — Ninos Donabed
(74) *Attorney, Agent, or Firm* — Novak Druce Connolly Bove + Quigg LLP

(57) ABSTRACT

The present technology describes creating and delivering a digital content package in a specified input structure to a content server for processing before distribution to client devices. The technology includes receiving one or more creatives, a targeted application, and a manifest associated with the targeted application within the digital content package. The content server uses the manifest to prepare an archive file containing selected resources related to the targeted application. The archive can be optimistically served to a client device along with one or more creatives for display on the client device and linking to the targeted application. A user selection of one of the one or more creatives can cause execution of the targeted application. Accordingly, the present technology leverages the use of the digital content package created by content providers to process new content and serve it to client devices.

13 Claims, 6 Drawing Sheets

(56) References Cited

U.S. PATENT DOCUMENTS

| | | | |
|---|---|---|---|
| 7,512,062 B2* | 3/2009 | Brady et al. | 370/216 |
| 7,512,635 B1* | 3/2009 | Solin | 1/1 |
| 7,574,706 B2* | 8/2009 | Meulemans et al. | 717/174 |
| 7,620,565 B2 | 11/2009 | Abelow | |
| 7,814,551 B2* | 10/2010 | Darweesh et al. | 726/26 |
| 7,849,459 B2* | 12/2010 | Burkhart et al. | 717/174 |
| 7,904,900 B2* | 3/2011 | Forsyth | 717/178 |
| 7,934,210 B1* | 4/2011 | Stampfli et al. | 717/168 |
| 7,937,672 B2* | 5/2011 | Casto | 715/830 |
| 7,978,182 B2 | 7/2011 | Ording et al. | |
| 8,060,856 B2* | 11/2011 | Besbris et al. | 717/106 |
| 8,132,120 B2 | 3/2012 | Stallings et al. | |
| 2001/0047365 A1 | 11/2001 | Yonaitis | |
| 2003/0037026 A1* | 2/2003 | Bantz et al. | 707/1 |
| 2003/0037325 A1* | 2/2003 | Hargrove et al. | 717/175 |
| 2003/0182652 A1* | 9/2003 | Custodio | 717/122 |
| 2004/0003389 A1* | 1/2004 | Reynar et al. | 717/178 |
| 2004/0015608 A1 | 1/2004 | Ellis et al. | |
| 2004/0034850 A1* | 2/2004 | Burkhardt et al. | 717/120 |
| 2004/0088397 A1* | 5/2004 | Becker et al. | 709/223 |
| 2004/0128583 A1* | 7/2004 | Iulo et al. | 714/25 |
| 2004/0225647 A1 | 11/2004 | Connelly et al. | |
| 2004/0230676 A1 | 11/2004 | Spivack et al. | |
| 2004/0250247 A1* | 12/2004 | Deeths et al. | 717/175 |
| 2005/0093891 A1 | 5/2005 | Cooper | |
| 2005/0195735 A1* | 9/2005 | Brady et al. | 370/216 |
| 2005/0235273 A1* | 10/2005 | Travison et al. | 717/136 |
| 2005/0240475 A1 | 10/2005 | Margiloff et al. | |
| 2005/0262501 A1* | 11/2005 | Marinelli et al. | 717/174 |
| 2006/0010345 A1* | 1/2006 | Schnoebelen et al. | 714/25 |
| 2006/0017692 A1 | 1/2006 | Wehrenberg et al. | |
| 2006/0031416 A1 | 2/2006 | Narin | |
| 2006/0074769 A1 | 4/2006 | Looney et al. | |
| 2006/0101453 A1* | 5/2006 | Burkhart et al. | 717/168 |
| 2006/0140141 A1 | 6/2006 | Moon et al. | |
| 2006/0143515 A1* | 6/2006 | Kuramkote et al. | 714/15 |
| 2006/0155790 A1* | 7/2006 | Jung et al. | 707/205 |
| 2006/0195334 A1* | 8/2006 | Reeb et al. | 705/1 |
| 2006/0224544 A1* | 10/2006 | Keith | 706/60 |
| 2007/0006014 A1* | 1/2007 | Huang | 714/2 |
| 2007/0033202 A1* | 2/2007 | Casto | 707/100 |
| 2007/0050679 A1* | 3/2007 | Reddy | 714/38 |
| 2007/0168462 A1* | 7/2007 | Grossberg et al. | 709/217 |
| 2007/0229541 A1 | 10/2007 | Klassen et al. | |
| 2007/0266320 A1 | 11/2007 | Adams et al. | |
| 2007/0279387 A1 | 12/2007 | Pletikosa et al. | |
| 2008/0004954 A1 | 1/2008 | Horvitz | |
| 2008/0025307 A1* | 1/2008 | Preiss et al. | 370/392 |
| 2008/0033997 A1 | 2/2008 | Banker | |
| 2008/0059545 A1* | 3/2008 | Brady et al. | 707/204 |
| 2008/0065491 A1 | 3/2008 | Bakman | |
| 2008/0071810 A1* | 3/2008 | Casto et al. | 707/100 |
| 2008/0140720 A1 | 6/2008 | Six et al. | |
| 2008/0143749 A1 | 6/2008 | Weybrew et al. | |
| 2008/0154738 A1 | 6/2008 | Jain | |
| 2008/0208712 A1 | 8/2008 | Yerkes | |
| 2008/0248834 A1* | 10/2008 | Chatterjee et al. | 455/557 |
| 2008/0254775 A1 | 10/2008 | Rohs | |
| 2008/0275764 A1* | 11/2008 | Wilson et al. | 705/10 |
| 2009/0002335 A1 | 1/2009 | Chaudhri | |
| 2009/0007093 A1* | 1/2009 | Lin | 717/174 |
| 2009/0030982 A1 | 1/2009 | Spivack et al. | |
| 2009/0037239 A1 | 2/2009 | Wong et al. | |
| 2009/0037724 A1 | 2/2009 | Carion et al. | |
| 2009/0043657 A1* | 2/2009 | Swift et al. | 705/14 |
| 2009/0049407 A1* | 2/2009 | Casto | 715/828 |
| 2009/0125343 A1 | 5/2009 | Cradick et al. | |
| 2009/0125376 A1 | 5/2009 | Sundaresan et al. | |
| 2009/0135919 A1* | 5/2009 | Vered et al. | 375/240.29 |
| 2009/0171847 A2 | 7/2009 | Bhambri et al. | |
| 2009/0171906 A1 | 7/2009 | Adams et al. | |
| 2009/0204476 A1 | 8/2009 | Abraham et al. | |
| 2009/0207138 A1 | 8/2009 | Thorn | |
| 2009/0248537 A1 | 10/2009 | Sarkesik | |
| 2009/0281874 A1 | 11/2009 | Leblance et al. | |
| 2009/0289956 A1 | 11/2009 | Douris | |
| 2009/0298480 A1 | 12/2009 | Khambete et al. | |
| 2009/0324100 A1 | 12/2009 | Kletter et al. | |
| 2010/0017385 A1* | 1/2010 | Wilcox et al. | 707/5 |
| 2010/0049608 A1* | 2/2010 | Grossman | 705/14.55 |
| 2010/0060664 A1 | 3/2010 | Kilpatrick et al. | |
| 2010/0066643 A1 | 3/2010 | King et al. | |
| 2010/0153831 A1 | 6/2010 | Beaton | |
| 2010/0169790 A1 | 7/2010 | Vaughan et al. | |
| 2010/0179991 A1* | 7/2010 | Lorch et al. | 709/206 |
| 2010/0235733 A1 | 9/2010 | Drislane et al. | |
| 2010/0281458 A1 | 11/2010 | Paladino | |
| 2010/0312824 A1* | 12/2010 | Smith et al. | 709/203 |
| 2010/0317332 A1 | 12/2010 | Bathiche et al. | |
| 2010/0317371 A1 | 12/2010 | Westerinen et al. | |
| 2011/0016427 A1* | 1/2011 | Douen | 715/828 |
| 2011/0054834 A1 | 3/2011 | Partridge et al. | |
| 2011/0087529 A1 | 4/2011 | Angell | |
| 2011/0125755 A1 | 5/2011 | Kaila et al. | |
| 2011/0177774 A1* | 7/2011 | Gupta et al. | 455/3.06 |
| 2011/0177775 A1* | 7/2011 | Gupta et al. | 455/3.06 |
| 2011/0202947 A1* | 8/2011 | Gupta et al. | 725/14 |
| 2011/0202966 A1* | 8/2011 | Gupta et al. | 725/114 |
| 2011/0209181 A1* | 8/2011 | Gupta et al. | 725/62 |
| 2011/0210922 A1 | 9/2011 | Griffin | |
| 2012/0054664 A1 | 3/2012 | Dougall et al. | |
| 2012/0210259 A1 | 8/2012 | Bederson et al. | |

OTHER PUBLICATIONS

Collberg, Christian et al., "A Taxonomy of Obfuscating Transformations", Technical Report #148, Department of Computer Science, University of Aukland, Jul. 1997.

Christopher M. Judd and Hakeem Shittu, "Web Packaging and Deployment," Pro Eclipse JST, Plug-ins for J2EE Development, Sep. 8, 2005, pp. 241-261, Apress, Berkeley, CA.

* cited by examiner

- ***myApp*.ad** ⟋102
  - Properties ⟋104
  - Creatives ⟋106
    - *foo (creative #1)* ⟋108
      - HTMLBanner
        - index.html
      - ImageBanners
    - *bar (creative #2, etc.)* ⟋110
      - HTMLBanner
        - index.html
      - ImageBanners
- AppUnit ⟋112
  - index.html ⟋114
  - manifest ⟋116

- webarchive ⟋118

FIG. 1

DIGITAL CONTENT BUNDLE

FIELD

The following relates to creating a digital content bundle and more specifically to creating a digital content bundle for ingestion into a content server.

BACKGROUND

Many electronic devices, including smart phones, tablet computers, and laptop computers allow users to download and run applications. Examples of applications that can be downloaded include, for example, games, music, and news applications. Users can download these applications from an on-line store. These applications are popular with consumers in part because they allow a consumer to conveniently download applications of particular interest to each user. Content providers desire to display content targeted to the interest of the user (targeted content) within these applications. Displaying targeted content within a targeted application allows a content provider to send its targeted content to users of specific applications, which may have more interest in the specified content.

Content creators typically upload or digitally send their media to a content server to make them available for distribution as targeted content. This process can be complicated and time consuming inasmuch as there are many parameters and criteria that need to be met for proper ingestion of the media into the on-line stores.

Therefore, what is needed is a method and apparatus for generating targeted content configured to be ingested into a content server that can be operated in a simple manner.

SUMMARY

Accordingly, a method and system for receiving a package of digital content at a server and processing the package into a format suitable for distribution by the server is disclosed.

Just as in any process, whether performed on a computer or an assembly line, a recognized input needs to be provided to result in a desired output. The present technology addresses receiving a specified input and processing the input for use by a server before distribution to client devices.

In particular, the present technology relates to creation of digital content, which in preferred embodiments comes in the form of a targeted application for execution on a computing device such as a personal computer, laptop, tablet, or personal media-playing device. The targeted application can also be accompanied by additional applications and/or sub-routines, or resources used by the targeted application.

A content developer can develop a targeted application, which can be an application having content that is desired to be distributed and ultimately viewed by targeted users, and then package the targeted application and its associated files for ingestion by the server. This digital content package can include a directory containing the targeted application and referenced files. It can also include a directory of creatives, which can refer to the targeted application. The digital content package can also include a properties file to instruct the server regarding various attributes about the targeted application or the creatives and suggested platforms in which to deploy each. Additionally, the digital content package can include a manifest file for use by the server in packaging the targeted application for distribution to client devices.

In some embodiments, the creatives are themselves applications or images or files, such as html files that link to or direct a user to the full application. The creatives can be displayed at the instruction of the server. The creatives can also be displayed within other programs. In some embodiments, the creatives can be an advertisement for the full application. The server can create a full or partial webarchive for each creative.

In some embodiments, the properties file can instruct the server as to the desired attributes of the creatives and the targeted application. For example, the properties file can provide a background color for a creative or direct the server to display a given creative in a particular situation, e.g., display the creative with a sports application. The properties file can also indicate that a particular creative was created with a particular device in mind. Accordingly, the server can learn of various intended features for display of the creatives or of the targeted application. In some embodiments of the properties file, the server might consider the attributes listed in the properties file as suggestions rather than rules that must be abided.

In some embodiments of the manifest file, the targeted application developer can designate which resources should be prepackaged for delivery to the user. In some examples, a manifest file is only found in the directory containing the targeted application. The server can use the manifest file, which can list resources within the same directory, to gather the designated resources and package those resources along into a targeted application webarchive.

Using the package structure example described above, a content server can prepare the various creatives and the targeted application for distribution to a client device. When a client device requests content from the content server, the server can send one or more creatives, selected by the server, to the client device. The server can optionally send each creative within a full or partial webarchive. The server can also send, either at the same time or immediately following the creatives, the targeted application webarchive file. In other words, the targeted application webarchive file can be sent optimistically.

From a client device perspective, the device can request content from the server and receive one or more creatives for display. The client device will also receive the targeted application webarchive. If or when a user interacts with the displayed creative, which links to the targeted application, the client device can immediately launch the targeted application because it had been optimistically downloaded.

The benefits of the manifest file to server can now be better understood. Since the webarchive file is optimistically sent to the device, it is possible that the targeted application will never be needed. Accordingly, the server can strike a balance between packaging and sending the primary resources of the targeted application, in case they are needed, and wasting resources by sending a targeted application that will never be launched on the client device. To strike this balance the server packages only resources selected by the targeted application developer and designated in the manifest file. All other application resources can be fetched on demand when needed.

Accordingly, the present technology provides a package structure which a targeted application developer can use to submit his/her application to a content server. Using the defined package structure, the server can process the content to be sent to client devices in an efficient manner and a manner that preserves the intended operation of the targeted application as conceived by the content developer.

BRIEF DESCRIPTION OF THE DRAWINGS

FIG. 1 illustrates a digital content bundle package structure;

DESCRIPTION

Figure 2:
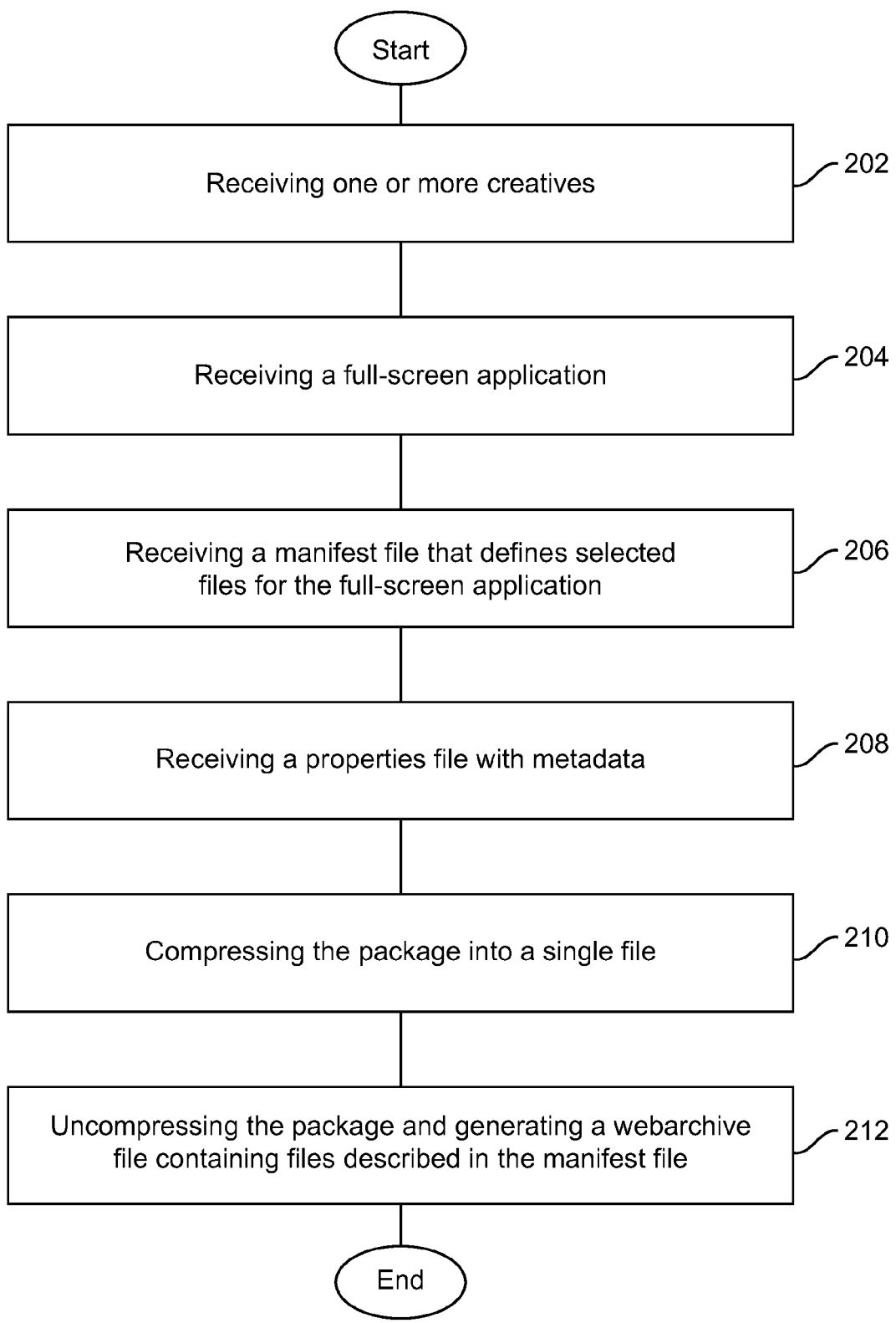
FIG. 2 illustrates a flow chart for creating and delivering a media package to a server.

The technology described herein relates to creating a digital content bundle for ingestion into a content server. A content provider desiring to publish his/her content to the content server must package the content into a recognizable format that the content server can ingest and process into a format suitable for distribution to client devices.

FIG. 1 illustrates an example of a digital-content-package structure prepared by a content provider. The digital content package can include a properties file, one or more creatives and a targeted application accompanied by a manifest file. The top-level directory of the package is identified as "myApp" 102.

The "myApp" directory includes a properties file 104 that describes properties of the digital content bundle. For example, one property in the properties file 104 can include an "action" description. This "action" description defines what action will occur when a user input is received when a user clicks on a creative. Another property in the properties file 104 can include an "initial orientation" that describes the orientation in which a creative should be viewed in when it launches. A further property in the properties file 104 can include a "supported orientation" property that describes the orientations that a given creative or the targeted application will support. Exemplary values can include portrait, landscape, or all for both. Another property in the properties file 104 can include a "scrolling" property that describes if scrolling should be allowed for a creative or the targeted application. Yet another property in the properties file 104 can include a "background-color" property that describes a background color for a creative or the targeted application. In one example, the "background-color" property is defined as a HEX value such as "7BA9C4".

The properties file is not limited to describing the properties described above. It should be appreciated that the properties file can be used to describe any other property that the content developer designates. For example, the properties file can describe supported devices, content that the creatives or application can be associated with, properties regarding the targeted applications operation, display, use, etc. In some embodiments the properties file can also be used to describe when a content developer envisions a creative might be distributed to a client device. For example, certain creatives might be designated for distribution to specified smartphones, or for use with specified applications or in specified contexts, etc.

The "myApp" directory also includes a folder for creatives 106 labeled "creatives" in FIG. 1. Each of the creatives can be applications or images that link to a targeted application found in the "AppUnit" directory 112.

The "creatives" directory 106 illustrated in FIG. 1 includes, by way of example, a first creative "foo" 108 and a second creative "bar" 110. As shown, first creative "foo" 108 contains an "HTMLBanner" folder including a file named "index.html" and a folder named "ImageBanners". In one example, the "HTMLBanner" folder presents the HTML code for a creative, and the "ImageBanners" folder contains reveal images that are displayed during a transition from executing the creative to executing the targeted application. In other examples, a creative can have only an "HTMLBanner" folder or "ImageBanners" folder.

Also, the second exemplary creative "bar" 110 also contains an "HTMLBanner" folder including a file named "index.html" and a folder named "ImageBanners". As described above, in one example the "HTMLBanner" folder contains the HTML code for the creative, and the "ImageBanners" folder contains reveal images that are displayed during a transition from executing the creative to executing the targeted application. In other examples, a creative can have only an "HTMLBanner" folder or "ImageBanners" folder.

The digital content bundle also includes a targeted application "AppUnit" 112, which in most embodiments of the AppUnit application can be presented in full screen. The targeted application "AppUnit" includes an index.html file 114, which in this example, constitutes the targeted application and a manifest file 116, but can also include additional resources for use in association with the targeted application.

The manifest file 116 defines selected items that should be packaged with the targeted application for distribution to a client device, such as a smart phone. In some embodiments, the manifest file can also contain additional information, for example a command to compress the selected items to be packaged with the targeted application for distribution into a single file. The manifest file 116, in one embodiment, is a text file with paths for all resources to be included in the webarchive. If a resource is included in the manifest file, it also should be included in the "myApp" directory. Additional items that are not included in the manifest file can also be included in the "myApp" directory. A targeted application designer can choose which items are most important upon execution of the targeted application by listing these items in the manifest file; all other items can be downloaded after execution of the targeted application. This allows application developers to strike a balance between content immediately available upon execution of the targeted application and device performance characteristics such as speed and memory usage as will become more apparent from the description below.

In one example, the manifest file 116 can be formatted in the following manner: (1) The first line of the file must contain the manifest version such as "Manifest-Version X.X"; (2) Comments are allowed. Comments can be single line, start with a hash mark (#), and can appear on its own line; (3) Each file or path must appear on a line of its own; (4) All paths are relative to the manifest file; (5) If the path points to a directory, then the contents of that directory will be included in the webarchive file; and (6) If the path points to a file, then that file will be included in the webarchive file. This formatting is merely illustrative and other formatting techniques can be implemented.

The package including 102, 104, 106, 108, 110, 112, 114, and 116 can be compressed into a single file and then sent to a server for ingestion by the targeted application developer for distribution to client devices.

Upon ingesting, uncompressing, and analyzing the digital content package including the manifest file 116, the server, to which the targeted application bundle is uploaded, will create a webarchive 118 next to the manifest 116 file as shown. The webarchive 118 will contain the selected items as defined in the manifest file that will be sent with the application to a user device. In a further example, the server can create a webarchive file for each creative (not shown).

FIG. 2 illustrates a flow chart for delivering the content package described above to a server and processing it to be available for distribution to client devices. The method includes receiving, by the server, one or more creatives 202 and a targeted application 204. The method further includes receiving a manifest file 206 that, as addressed above, contains paths for selected files and folders for reference or use by the targeted application archive. The method includes receiving a descriptive file with metadata 208. This descriptive file can be the same as the properties file discussed above. The method then includes compressing the media package 210, and transmitting the compressed media package for ingesting into the server.

At step 212, once the server has ingested the compressed media package, the server can uncompress the media package and check the package for errors. This error checking process can include looking for proper acceptable structure of the file and ensuring there are no missing values for the media package. The server can analyze the manifest file. This analysis of the manifest file can include sanitizing paths to describe files listed in the manifest and other error detection techniques as needed. The server can also ignore paths that might cause security risks, such as paths that reference files that are not within the same folder or location as the manifest file.

Once the server completes any error detection, the method can include generating a webarchive file. In this example, the webarchive is created next to the manifest file 116. The webarchive contains the selected files or folders as defined in the paths in the manifest file that will be sent with the application to a user device. In one example, the folders and files in the webarchive can be compressed to a single file.

In some embodiments, the method can include generating a webarchive file for each creative in a content bundle. In this example, a webarchive file for a creative can include all files needed to run the creative, which in such embodiments, is itself a targeted application, hereinafter called "creative application." In some embodiments, each creative application can have its own manifest file, to define selected items the server should place in each archive file. In this example, the server can create an archive file for a creative application in the same directory as its related manifest file.

In one example, the one or more creatives are in HTML and include a digital image. In another example, the one or more creatives can be a single image. In another example, the creative application is in HTML and includes a digital image.

The descriptive file with metadata can be in XML. The one or more creatives can be advertisements. Also, the targeted application can be an advertisement.

After generating the webarchive file, the server can select particular portions of the media bundle, in response to a device request, and send those selected portions to a client device to run within a user application.

Figure 3:
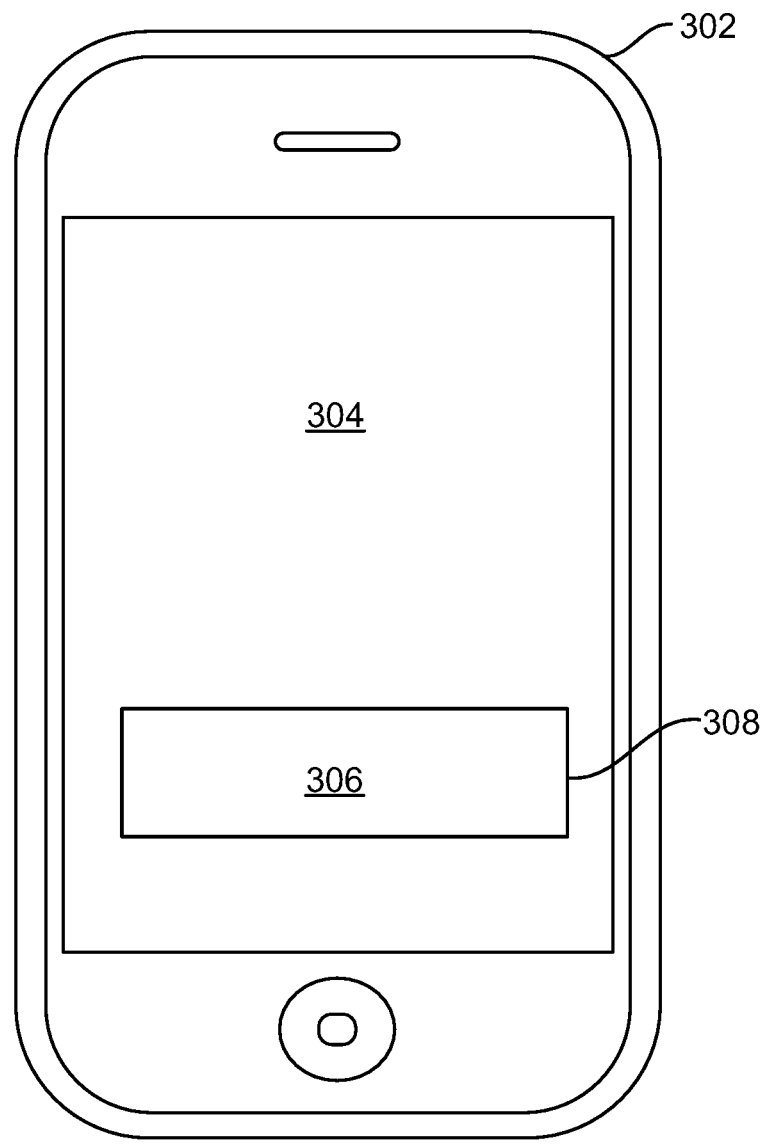
FIG. 3 illustrates an exemplary display presenting a creative within a primary application.

FIG. 3 illustrates an exemplary device 302 displaying a user application 304 and a creative 306 in a view 308 within the user application 304. As illustrated, the device 302 is a handheld computing device, for example, a smart phone, e.g., an IPHONE, by Apple Inc. of Cupertino, Calif. However, the device 302 can be any computing device such as a personal computer, laptop, tablet, or personal media-playing device; even a household appliance having a processor and a display can be used with the present technology.

The user application 304 can be any application that reserves a view 308 or a window or a frame to display the creative 306. In some embodiments, the view has a standard dimension that is consistent across all potential user applications. In some embodiments, the view 308 occupies about ten percent of the available screen area. Of course, the creative can occupy any desired portion of the user application. However, the area of the creative should not be so large as to obscure or detract from the user application, yet the creative should be large enough to view and interact with.

The creative 306 can be any image or application having content that is created with an audience in mind and can be targeted to that audience. For example, the creative can be a game for children; a web application targeted at sports fans; or an advertisement for home improvement products targeted at home owners. In some preferred embodiments, the creative 306 can have some relationship to the user application 304, such as a similarity in the target demographic for the audiences of both applications or in the nature of the content of the targeted applications, etc.

Figure 4:
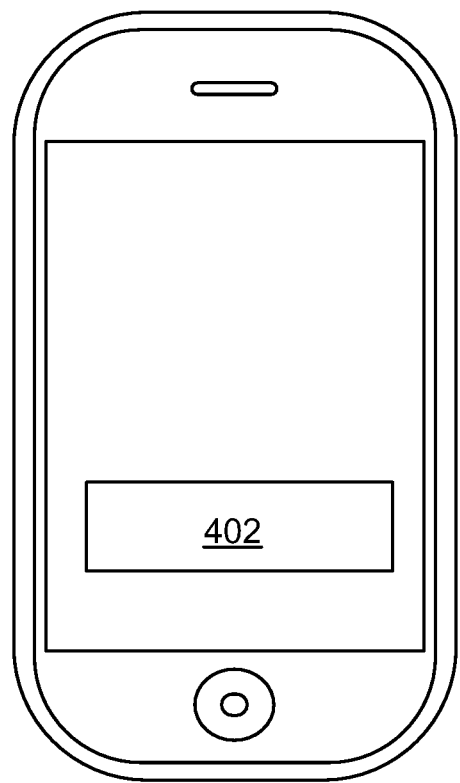
FIG. 4 illustrates an exemplary display presenting a creative within a primary application in a portrait and landscape orientation.
Figure 4:
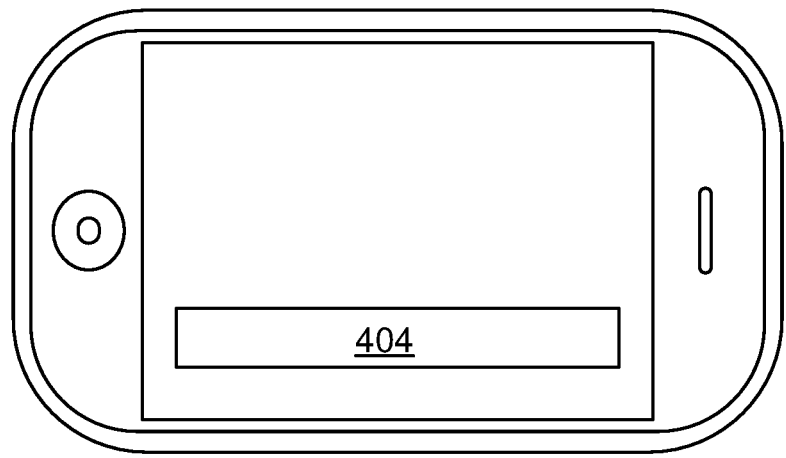

Multiple creative configurations can be downloaded if the device has multiple possible presentation formats, such as portrait and landscape. In such aspects, it is anticipated that a view in portrait will not be as desirable in landscape. In some embodiments, it is desired that the creative view and configuration occupy only about ten percent of the display. As illustrated in FIG. 4, a creative in the portrait view (402) is fatter but thinner than the creative view in the landscape view (404). In the illustrated example, both views take up only about ten percent of the available screen area.

When the device is in a first orientation, for example a portrait orientation, and then rotates to a second orientation, for example a landscape orientation, the creative view can resize along with the rest of the user application, and the creative view configuration for that orientation can be displayed. When the device is rotated into a different orientation, the user application will react to the change in orientation by rotating its view and resizing itself according to the new orientation. A user application that can be displayed in both landscape and portrait orientations can download a targeted application that can fit both orientations. When the device is rotated, the creative changes shape and animates to show content appropriate to the new aspect ratio. The content is still the same creative; it just has a slightly different representation for the new aspect ratio.

Figure 5:
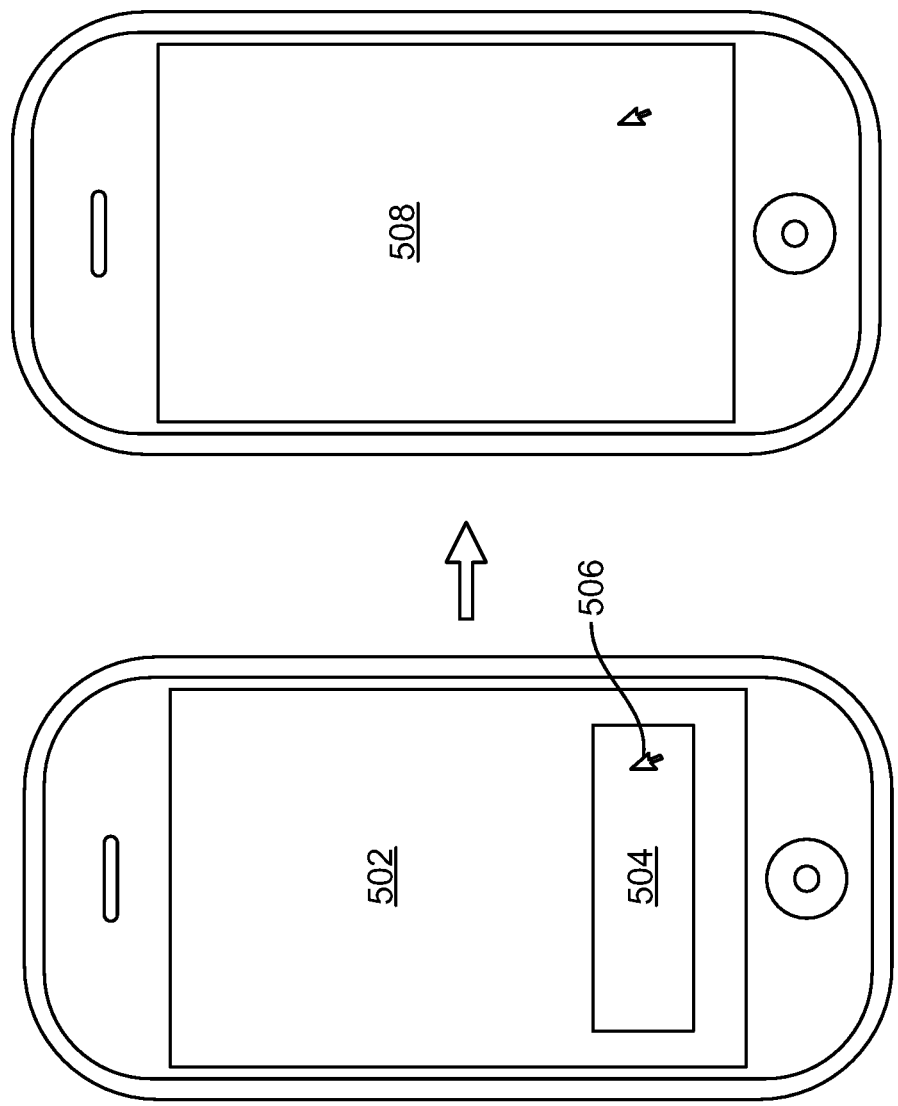
FIG. 5 illustrates an interactive application and the screen application and closing of the creative in response to a user input.

After a creative and a targeted application are sent to a client device, the creative, running in a user application (502), can be interactive and cause execution of the targeted application and closing of the creative in response to a user input. As illustrated in FIG. 5, a user can select the creative (504) using a pointing device (506). In the illustrated embodiment, the device has a touch screen input and thus a finger touch is illustrated, although any other selection mechanism is acceptable. Upon selection, the creative 504 causes execution of application (508). At the left of FIG. 5, the creative is shown in view (504), while at the far right the targeted application (508) is running due to selection of the creative by a user. This application 508 provides the full interactive content of a digital content bundle.

Figure 6:
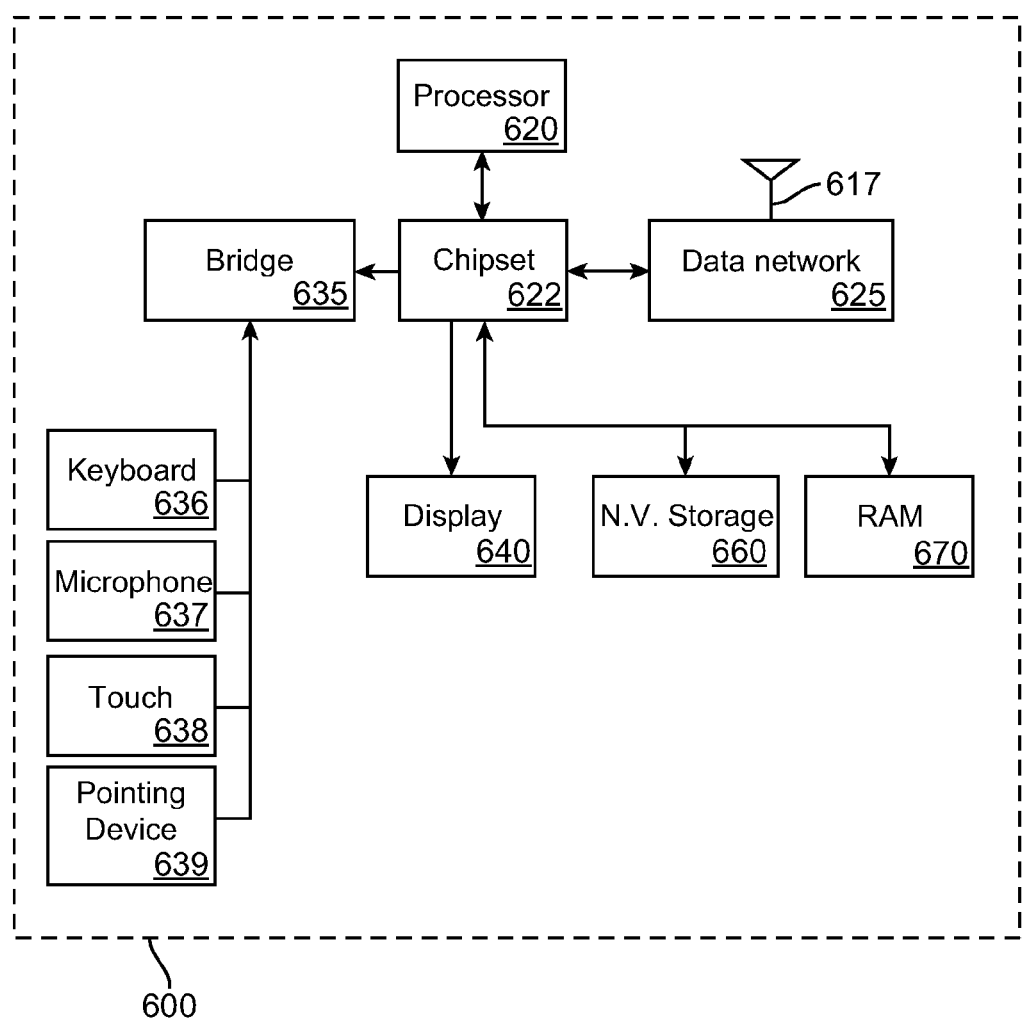
FIG. 6 is a schematic illustration of an exemplary system embodiment.

FIG. 6 illustrates a computer system 600 used in executing the described method. Computer system 600 is an example of computer hardware, software, and firmware that can be used to implement disclosures above. System 600 includes a processor 620, representative of any number of physically and/or logically distinct resources capable of executing software, firmware, and hardware configured to perform identified computations. Processor 620 communicates with a chipset 622 that can control input to and output from processor 620. In this example, chipset 622 outputs information to display 640 and can read and write information to non-volatile storage 660, which can include magnetic media and solid-state media, for example. Chipset 622 also can read data from and write data to RAM 670. A bridge 635 for interfacing with a variety of user interface components can be provided for interfacing with chipset 622. Such user interface components can include a keyboard 636, a microphone 637, touch detection and processing circuitry 638, a pointing device, such as a mouse 639, and so on. In general, inputs to system 600 can come from any of a variety of sources, machine-generated and/or human-generated.

Chipset 622 also can interface with one or more data network interfaces 625 that can have different physical interfaces 617. Such data network interfaces can include interfaces for wired and wireless local area networks, for broadband wireless networks, as well as personal area networks. Some applications of the methods disclosed herein can include receiving data over physical interface 617 or be generated by the machine itself by processor 620 analyzing data stored in memory 660 or 670. Further, the machine can receive inputs from a user via devices 636, 637, 638, 639 and execute appropriate functions, such as browsing functions, by interpreting these inputs using processor 620.

Methods according to the above-described examples can be implemented using computer-executable instructions that are stored or otherwise available from computer-readable media. Such instructions comprise, for example, instructions and data which cause or otherwise configure a general purpose computer, special purpose computer, or special-purpose processing device to perform a certain function or group of functions. Portions of computer resources used can be accessible over a network. The computer executable instructions may be, for example, binaries, intermediate-format instructions such as assembly language, firmware, or source code, including transitory signals carrying the instructions. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving a digital content package comprising a creative, a targeted application, and a manifest, the targeted application being associated with a plurality of resources, and the manifest indicating a selected subset of the plurality of resources, wherein the selected subset is designated from the plurality of resources to be prepared for a single instance of distribution to a client device;
error-checking the manifest, wherein error-checking comprises by verifying proper structure of the resources, searching for missing values, and analyzing the manifest for security risks including removing paths to resources that are not included in the digital content package; and
preparing components of the digital content package for distribution to the client device, wherein preparing components of the digital content package comprises:
storing data describing the devices for which the creative is targeted, the content for which the creative should be associated with, and the demographics for which the creative is targeted;
generating a webarchive of the targeted application and a selected file of the selected subset, the selected file being included in the webarchive based on the selected file's inclusion in the manifest; and
storing the webarchive of the targeted application in a directory on a server along with resources that were not selected for inclusion in the webarchive;
executing a targeted application testing program, wherein a webarchive is created to include the targeted application and the subset of resources identified in the manifest;
receiving a selection of the creative;
receiving an input into the creative, the input being effective to cause execution of the targeted application from the webarchive; and
receiving an input into the executed application, whereby a successful execution of the creative confirms a performance of the webarchive creation, the targeted application and the creative in the testing program.

2. The method of claim 1, wherein preparing the components of the digital content package for distribution to the client device further comprises identifying the creative.

3. The method of claim 2, wherein identifying the creative includes analyzing the creative and storing data describing the creative, the data to be used in selecting which creative to send to the client device.

4. The method of claim 3, wherein the data to be used in selecting which creative to send to the client device comprises a list of available creatives.

5. The method of claim 3, wherein the data to be used in selecting which creative to send to the client device comprises data describing devices for which the creative is targeted, content for which the creative should be associated with, and demographics for which the creative is targeted.

6. A product comprising:
a non-transitory computer-readable medium having a collection of computer-readable data stored thereon and being in a specified directory structure suitable for processing by a content server, the collection of computer-readable data comprising:
data defining a top-level directory;
data making up a descriptive resource that is descriptive of various properties of a targeted application and a creative;

data defining a first sub-directory located within the top-level directory storing the targeted application and its associated resources and a manifest identifying paths to the targeted application and a subset of resources selected from among the targeted application's associated resources, wherein the subset of resources is designated from the application's associated resources to be prepared for a single instance of distribution;

data defining an error-checking component of the manifest, wherein error-checking comprises verifying proper structure of the resources, searching for missing values, and analyzing the manifest for security risks including removing paths to resources that are not included in the targeted application and its associated resources; and data defining a second sub-directory located within the top-level directory storing the creative wherein the collection of computer-readable data causes a computer to perform operations comprising:

preparing a webarchive including the targeted application and the subset of resources identified in the manifest; and preparing the creative for distribution to client devices by examining the descriptive resource and storing data indicative of the properties of the creative as provided by the descriptive resource;

storing data describing the devices for which the creative is targeted, the content for which the creative should be associated with, and the demographics for which the creative is targeted;

generating a webarchive of the targeted application and a selected file of the selected subset, the selected file being included in the webarchive based on the selected file's inclusion in the manifest;

storing the webarchive of the targeted application in a directory on a server along with resources that were not selected for inclusion in the webarchive;

executing a targeted application testing program, wherein a webarchive is created to include the targeted application and the subset of resources identified in the manifest;

receiving a selection of the creative;

receiving an input into the creative, the input being effective to cause execution of the targeted application from the webarchive; and receiving an input into the executed application, whereby a successful execution of the creative confirms a performance of the webarchive creation, the targeted application and the creative in the testing program.

7. The product of claim 6, wherein the collection of computer-readable data causes a computer to perform operations comprising:

transmitting the creative to a client device in accordance with the stored data indicative of the properties of the creative.

8. The product of claim 6, wherein the collection of computer-readable data causes a computer to perform operations comprising:

transmitting the webarchive to a client device.

9. A system comprising: a processor; and
a non-transitory computer-readable storage medium having stored therein instructions which, when executed by the processor, cause the processor to perform operations comprising:

receiving a digital content package including one or more creatives, a targeted application, and a manifest, the targeted application being associated with a plurality of resources, and the manifest indicating a selected subset of resources, wherein the selected subset is designated from the plurality of resources to be prepared for a single instance of distribution to a client device;

storing the digital content package;

error-checking the manifest by verifying proper structure of the resources, searching for missing values, and analyzing the manifest for security risks including removing paths to resources that are not included in the digital content package;

preparing components of the digital content package for distribution to the client device, wherein preparing components of the digital content package comprises:

storing data describing the devices for which the creative is targeted, the content for which the creative should be associated with, and the demographics for which the creative is targeted;

generating a webarchive of the targeted application and selected files of the subset of resources associated with the targeted application, the selected files being included in the webarchive based on their inclusion in the manifest;

storing the webarchive of the targeted application in a directory on a server along with resources that were not selected for inclusion in the webarchive;

executing a targeted application testing program, wherein a webarchive is created to include the targeted application and the subset of resources identified in the manifest;

receiving a selection of the creative;

receiving an input into the creative, the input being effective to cause execution of the targeted application from the webarchive; and receiving an input into the executed application, whereby a successful execution of the creative confirms a performance of the webarchive creation, the targeted application and the creative in the testing program.

10. The system of claim 9, wherein preparing the components of the digital content package for distribution to the client device further comprises identifying each of the one or more creatives.

11. The system of claim 10, wherein identifying each of the one or more creatives includes analyzing the creatives and storing data describing the creatives, the data to be used in selecting which of the one or more creatives to send to the client device.

12. The system of claim 11, wherein the digital content package further includes a properties file describing data to be used in selecting which of the one or more creatives to send to the client device.

13. The system of claim 12, wherein the data to be used in selecting which of the one or more creatives to send to the client device comprises data describing devices for which one or more of the creatives is optimized, content for which one or more of the creatives should be associated with, and demographics for which one or more of the creatives are optimized.

* * * * *